(12) United States Patent
Barth et al.

(10) Patent No.: US 11,010,626 B2
(45) Date of Patent: May 18, 2021

(54) SYSTEM AND METHOD FOR GENERATING A CONFIDENCE VALUE FOR AT LEAST ONE STATE IN THE INTERIOR OF A VEHICLE

(71) Applicant: Aptiv Technologies Limited, St. Michael (BB)

(72) Inventors: Alexander Barth, Wuppertal (DE); Patrick Weyers, Dortmund (DE)

(73) Assignee: Aptiv Technologies Limited, St. Michael (BB)

( * ) Notice: Subject to any disclaimer, the term of this patent is extended or adjusted under 35 U.S.C. 154(b) by 196 days.

(21) Appl. No.: 16/196,193

(22) Filed: Nov. 20, 2018

(65) Prior Publication Data

US 2019/0171892 A1 Jun. 6, 2019

(30) Foreign Application Priority Data

Dec. 4, 2017 (EP) .................................... 17205093

(51) Int. Cl.
| | |
|---|---|
| *G06K 9/00* | (2006.01) |
| *G06K 9/62* | (2006.01) |
| *G06K 9/46* | (2006.01) |
| *G06N 3/08* | (2006.01) |

(52) U.S. Cl.
CPC ....... *G06K 9/00838* (2013.01); *G06K 9/4628* (2013.01); *G06K 9/6262* (2013.01); *G06K 9/6282* (2013.01); *G06N 3/08* (2013.01)

(58) Field of Classification Search
CPC ............. G06K 9/00838; G06K 9/4628; G06K 9/6262; G06K 9/6282; G06N 3/08

USPC .......................................................... 382/156
See application file for complete search history.

(56) References Cited

U.S. PATENT DOCUMENTS

| | | |
|---|---|---|
| 7,483,866 B2 | 1/2009 | Luo |
| 10,322,728 B1 | 6/2019 | Porikli et al. |
| 2002/0059022 A1 | 5/2002 | Breed et al. |
| 2004/0220705 A1 | 11/2004 | Basir et al. |
| 2007/0055428 A1 | 3/2007 | Kong et al. |

(Continued)

OTHER PUBLICATIONS

Yan Chao et al: "Driving posture recognition by convolutional neural networks", Mar. 2016, pp. 102-114.

(Continued)

*Primary Examiner* — Stephen P Coleman
(74) *Attorney, Agent, or Firm* — Colby Nipper PLLC

(57) ABSTRACT

A system for generating a confidence value for at least one state in the interior of a vehicle, comprising an imaging unit configured to capture at least one image of the interior of the vehicle, and a processing unit comprising a convolutional neural network, wherein the processing unit is configured to receive the at least one image from the imaging unit and to input the at least one image into the convolution-al neural network, wherein the convolutional neural network is configured to generate a respective likelihood value for each of a plurality of states in the interior of the vehicle with the likelihood value for a respective state indicating the likelihood that the respective state is present in the interior of the vehicle, and wherein the processing unit is further configured to generate a confidence value for at least one of the plurality of states in the interior of the vehicle from the likelihood values generated by the convolutional neural network.

20 Claims, 6 Drawing Sheets

(56) References Cited

U.S. PATENT DOCUMENTS

| | | | |
|---|---|---|---|
| 2013/0204457 A1* | 8/2013 | King | G06K 9/00355 701/1 |
| 2018/0025240 A1 | 1/2018 | Klement et al. | |
| 2018/0300553 A1 | 10/2018 | Khosla et al. | |
| 2019/0019068 A1* | 1/2019 | Zhu | G06K 9/6293 |
| 2019/0213406 A1 | 7/2019 | Porikli et al. | |
| 2021/0081689 A1 | 3/2021 | Weyers et al. | |

OTHER PUBLICATIONS

"Extended European Search Report", EP Application No. 19197820.4, dated Mar. 20, 2020, 9 pages.

Behera, et al., "Context-driven Multi-stream LSTM (M-LSTM) for Recognizing Fine-Grained Activity of Drivers", Feb. 14, 2019, pp. 298-314.

Demirdjian, et al., "Driver Pose Estimation with 3D Time-of-Flight Sensor", Mar. 30, 2009, 8 pages.

Coleca, et al., "Self-Organizing Maps for Hand and Full Body Tracking", Jun. 2014, pp. 174-184, 11 pages.

Droeschel, et al., "3D Body Pose Estimation Using an Adaptive Person Model for Articulated ICP", Dec. 2011, 12 pages.

Finelli, et al., "Real Time Head Pose Estimation with Random Regression Forests", Jun. 2011, pp. 617-624, 8 pages.

He, "Deep Residual Learning for Image Recognition", Dec. 10, 2015, 12 pages.

Kohsia, et al., "Drivers View and Vehicle Surround Estimation Using Omnidirectional Video Stream", Jul. 2003, pp. 444-449, 6 pages.

Krizhevsky, et al., "ImageNet Classification with Deep Convolutional Neural Networks", May 2017, 9 pages.

Le, et al., "Fully Automated Multi-label Image Annotation by Convolutional Neural Network and Adaptive Thresholding", Dec. 2016, 8 pages.

Murphy-Chutorian, et al., "Head Pose Estimation in Computer Vision: A Survey", Apr. 2009, pp. 607-626, 20 pages.

Redmon, et al., "YOLO9000: Better, Faster, Stronger", Jul. 2017, 9 pages.

Simonya, et al., "Very Deep Convolutional Networks for Large-Scale Image Recognition", Apr. 10, 2015, 14 pages.

Szegedy, et al., "Going Deeper with Convolutions", Sep. 17, 2014, 12 pages.

Wang, et al., "CNN-RNN: A Unified Framework for Multi-label Image Classification", Apr. 2016, 10 pages.

Xia, et al., "Human Detection Using Depth Information by Kinect", Jun. 2011, pp. 15-22, 8 pages.

Zeng, et al., "Microsoft Kinect Sensor and Its Effect", Feb. 2012, 8 pages.

"Foreign Office Action", EP Application No. 172050932, dated Mar. 25, 2021, 6 pages.

* cited by examiner

SYSTEM AND METHOD FOR GENERATING A CONFIDENCE VALUE FOR AT LEAST ONE STATE IN THE INTERIOR OF A VEHICLE

TECHNICAL FIELD OF INVENTION

The present application relates to a system and a method for generating a confidence value for at least one state in the interior of a vehicle.

BACKGROUND OF INVENTION

Different levels of vehicle automation require different levels of driver awareness.

As long as vehicles are not fully automated and able to handle all traffic conditions, a human driver is still required to be able to take back the control.

The response time might be different based on the automation level, reaching from a few seconds to several minutes. In order to assess the driver awareness level vehicles are equipped with different sensors, for example, sensors inside the seats to detect the presence of a person in the seat, sensors in the steering wheel to detect if a hand is at the steering wheel and driver facing cameras analyzing the head and eye movements or eye lit closure rates.

However, all of the above systems have limitations and can be error prone, or ambiguous in the output. For example, pressure sensors in the seats might not correctly distinguish a person in the seat from an object, steering wheel sensors cannot distinguish, for example, the contact of a hand or knee, and might be misled by other objects, e.g., a can of soda taped to the steering wheel can be recognized as a hand. Driver facing cameras are limited in field of view and the availability of the system depends on the orientation of the face and the visibility, for example, of the eyes or other facial feature points.

Fusing the information of one or more of these sensors allows to increase the confidence level of the driver state estimation.

Automotive grade time-of-flight camera sensors monitoring the interior of a vehicle, e.g. for hand gesture control systems, are available on the market since 2015. The sensor provides distance information, i.e. a depth map, and amplitude measurements for an array of pixels. With such sensor data it is possible, for example, to localize a human hand in 3D space, including the hand centroid, the position and orientation of the fingers, as well as the 3D trajectory of such positions, for example the history of previous positions. In addition, one can derive a 3D velocity vector for characteristic points on the hand or a 3D pointing vector along the index finger.

However, the same sensor can be used for many different applications. Beyond the detection of open space hand gestures, this information can be used, for example, for advanced proximity sensing within the field of view of the sensor, e.g. hands close to the display or other control elements, hands on steering wheel, etc., and in particular to monitor a state of persons in the vehicle.

If the sensor's field of view, for example, covers the area of the front seats of a vehicle including the driver and/or passenger, fully or partially, it is possible to extend the feature range from hand detection and tracking to other body parts such as head and shoulder, arms, torso, legs, etc.

One prominent example is the estimation of a head pose, i.e., 3D position and orientation, for example to predict where the person is looking at.

Several methods exist to extract, for example, a 3D skeleton of a human body model based on 3D imagery or point cloud data.

The model can combine the measured data with constraints of the human anatomy to stabilize the pose estimation results in the presence of noisy input data.

Such a model can be fitted to the data in frame-by-frame basis (single time step) or tracked over multiple frames (time series) to allow for some temporal smoothing of the results.

The relative location of body parts, e.g. hands, with respect to vehicle parts, e.g. steering wheel, can be used to implement features like hands on steering wheel detection.

In addition the data can be used to estimate the size (or weight) of a person in the seat or the distance of the person to an airbag.

Full body pose estimation methods typically require a significant amount of processing power to achieve high performance at real-time frame rates and are not suitable for low-cost embedded platforms.

SUMMARY OF THE INVENTION

It is an underlying object of the invention to provide a system for generating a confidence value for at least one state in the interior of a vehicle, wherein the system generates results with high accuracy and without requiring detailed models of people, vehicle interior or explicit knowledge of the location of different body parts with respect to the vehicle interior. Further, the system shall not require a large number of sensors. In addition, it is an object of the invention to provide a vehicle that comprises the system and a method for generating a confidence value for at least one state in the interior of a vehicle.

In a first aspect of the application, a system for generating a confidence value for at least one state in the interior of a vehicle is provided.

The system comprises an imaging unit and a processing unit with a trained convolutional neural network.

Further, a plurality of predetermined possible states is given, which may be present in the interior of the vehicle. For example, one of the predetermined states may describe the state that the driver seat is occupied, another one of the predetermined states may refer to the state that a person occupies the driver seat, and a third state may describe the state according to which the driver has his hands on the steering wheel.

The imaging unit is configured to capture at least one image of the interior of the vehicle. The processing unit is configured to receive the at least one image from the imaging unit and to input the at least one image into the convolutional neural network.

The convolutional neural network is configured to use the at least one image in order to generate a respective likelihood value for each state of the plurality of possible states in the interior of the vehicle. The likelihood value for a respective state indicates the likelihood that the respective state is present in the interior of the vehicle. For example, in case the state 'the driver seat is occupied' is observed, the likelihood value for this state gives the likelihood that the driver seat is occupied.

In addition, the processing unit calculates a confidence value for at least one of the plurality of predetermined states in the interior of the vehicle. The confidence value is calculated from one or several of the likelihood values generated by the convolutional neural network.

The system generates results with a high accuracy and without the need of detailed models of people, vehicle interior or explicit knowledge of the location of different body parts with respect to the vehicle interior. Instead of detecting and tracking individual body parts or estimating a body model in a first step to derive the confidence values in a second step, in this invention one or more confidence values for states in the vehicle are derived directly from the input imagery in one step.

For generating the confidence values the system only requires the imaging unit as a sensor. Other sensors such as seat occupancy sensors inside the seats or steering wheel sensors are not mandatory.

The confidence values for one or more states in the interior of the vehicle can be used to derive high level features such as driver awareness/distraction. The confidence values may be fused with data from other sensors, for example, driver facing cameras, steering wheel sensors and seat occupancy sensors.

The states, which are potentially present in the interior of the vehicle, may be selected from the following group of states: the driver seat is occupied, a person occupies the driver seat, an adult occupies the driver seat, the driver has his hands on the steering wheel, the driver is in a driving position, the driver interacts with an object, a predetermined seat other than the driver seat is occupied, a person interacts with a predetermined object and the driver seat is occupied by a predetermined object. In one embodiment, a plurality of the aforementioned states can be selected and the convolutional neural network is configured such that it generates a likelihood value from the at least one image captured by the imaging unit for each of the selected states.

In a preferred embodiment, the imaging unit is a 3D (three dimensional) imaging unit. The 3D imaging unit may be, for example, a time-of-flight camera. A time-of-flight camera resolves distance based on the known speed of light, measuring the time-of-flight of a light signal between the camera and the subject for each point of the image. A time-of-flight camera may, for example, include an infrared light emitting diode sending out infrared light, in particular a pulsed infrared light signal, and a camera sensor receiving the infrared light after the infrared light has been reflected by a subject. The time-of-flight camera has the advantage of suppressing the ambient light, e.g. sunlight. Thus only the infrared light from the active infrared illumination is captured.

Alternative 3D imaging units include, for example, stereo vision cameras or structured light cameras or radar systems. The 3D imaging unit can further be enhanced by a color sensitive image sensor.

As an alternative to an 3D imaging unit, other imaging units could be used, e.g., a 2D camera such as a grayscale or color imager without depth information.

The states that are potentially present in the interior of the vehicle may be arranged in a hierarchical structure including a plurality of hierarchical levels such as a hierarchical tree structure as discussed below in more detail in connection with the description of FIGS. 2 to 5. The processing unit may be configured to generate the confidence value for a respective one of the plurality of states in the interior of the vehicle by multiplying the likelihood value for the respective state with likelihood values for states that are arranged in hierarchical levels higher than the hierarchical level of the respective state, wherein the product of likelihood values includes exactly one likelihood value from each of the hierarchical levels contributing to the product.

For each of the plurality of states in the interior of the vehicle, the states in the hierarchically higher levels that are used for calculating the product of likelihood values may be predetermined. These states that are used for calculating the product of likelihood values may be given by a particular path in the hierarchical tree structure as explained below in connection with FIG. 2.

In one embodiment, at least one hierarchical level exists in the hierarchical structure that includes two or more states that are not mutually exclusive. This means that it is possible that two or more of the states in the same hierarchical level can be present in the interior of the vehicle at the same time. For example, one of the hierarchical levels may include the states 'the driver interacts with an object' and 'the driver is out-of-position'. Both of these states can be true at the same time in case the drivers interacts with an object, such as a smart phone, and is not in the driver position as he, for example, looks at the smart phone.

In one embodiment, the highest hierarchical level comprises the state 'the driver seat is occupied'. In particular, the second highest hierarchical level comprises the state 'a person occupies the driver seat', and the third highest hierarchical level comprises the state 'an adult occupies the driver seat'.

The convolution neural network is trained in one embodiment by means of predetermined images, which show scenes of the interior of the vehicle. The scenes shown by the predetermined images are known. The predetermined images are input in the convolutional neural network and, for each of the predetermined images, the convolutional neural network generates the likelihood values for the plurality of states. Further, since the scenes shown by the predetermined images are known, an annotation vector can be provided for each of the predetermined images, wherein the annotation vector represents the ideal target function and the annotation vector for a respective predetermined image indicates the states of the plurality of states that are relevant for the respective predetermined image. For example, if one of the predetermined images shows a box that is placed on the driver seat, the annotation vector indicates that the states 'the driver seat is occupied' and 'a person occupies the driver seat' are relevant for this image, but the state 'an adult occupies the driver seat' is not relevant for this image. Further, a loss function or cost function is calculated for each of the predetermined images, wherein only the likelihood values of the states that are relevant for the corresponding predetermined image contribute to the loss function. Thus, in the above example, the likelihood values calculated by the convolutional neural network for the states 'the driver seat is occupied' and 'a person occupies the driver seat' contribute to the loss function, whereas the likelihood value for the state 'an adult occupies the driver seat' does not contribute to the loss function. The task of the training of the convolutional neural network is to minimize the output of the loss function.

A training unit can be provided that inputs the predetermined images into the convolutional neural network and calculates the loss function.

According to a second aspect of the application, a vehicle comprises a system as explained above.

According to a third aspect of the application, a method for generating a confidence value for at least one state in the interior of a vehicle comprises the following steps: capturing at least one image of the interior of the vehicle; inputting the at least one image into a convolutional neural network; generating by means of the convolutional neural network a respective likelihood value for each of a plurality of states in the interior of the vehicle with the likelihood value for a respective state indicating the likelihood that the respective state is present in the interior of the vehicle; and generating a confidence value for at least one of the plurality of states in the interior of the vehicle from the likelihood values generated by the convolutional neural network.

The method according to the third aspect may include the same embodiments as described above in connection with the system according to the first aspect.

Further features and advantages will appear more clearly on a reading of the following detailed description of the preferred embodiment, which is given by way of non-limiting example only and with reference to the accompanying drawings.

BRIEF DESCRIPTION OF DRAWINGS

The invention will be described in more detail in the following in an exemplary manner with reference to exemplary embodiments and to the drawings. There are shown in these.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

'One or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Figure 1:
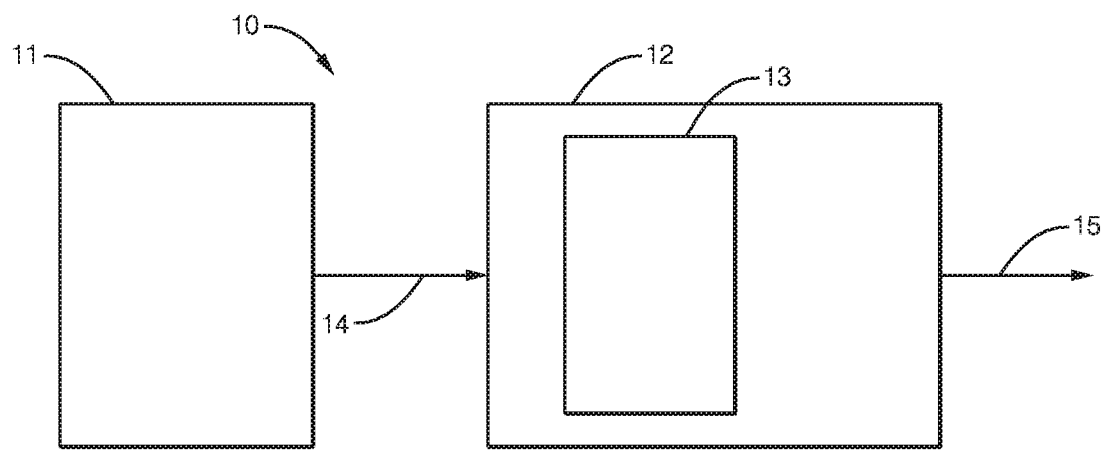
FIG. 1 is a schematic representation of an exemplary embodiment of a system for generating a confidence value for at least one state in the interior of a vehicle.

FIG. 1 illustrates an exemplary embodiment of a system 10 for generating a confidence value for at least one state in the interior of a vehicle according to the first aspect of the application. The system 10 can be installed in a vehicle according to the second aspect of the application. In the following, the system 10 and the function of the system 10 as an example of a method for generating a confidence value for at least one state in the interior of a vehicle according to the third aspect of the application are described.

The system 10 comprises an imaging unit 11 and a processing unit 12 with a convolutional neural network 13.

The imaging unit 11 is mounted on the vehicle and captures images 14 of the interior of the vehicle. The images 14 are fed to the processing unit 12.

The processing unit 12 inputs the images 14 into the convolutional neural network 13. The convolutional neural network 13 outputs likelihood values for possible states in the interior of the vehicle, wherein the likelihood value for a respective state indicates the likelihood that the respective state is present in the interior of the vehicle.

Figure 2:
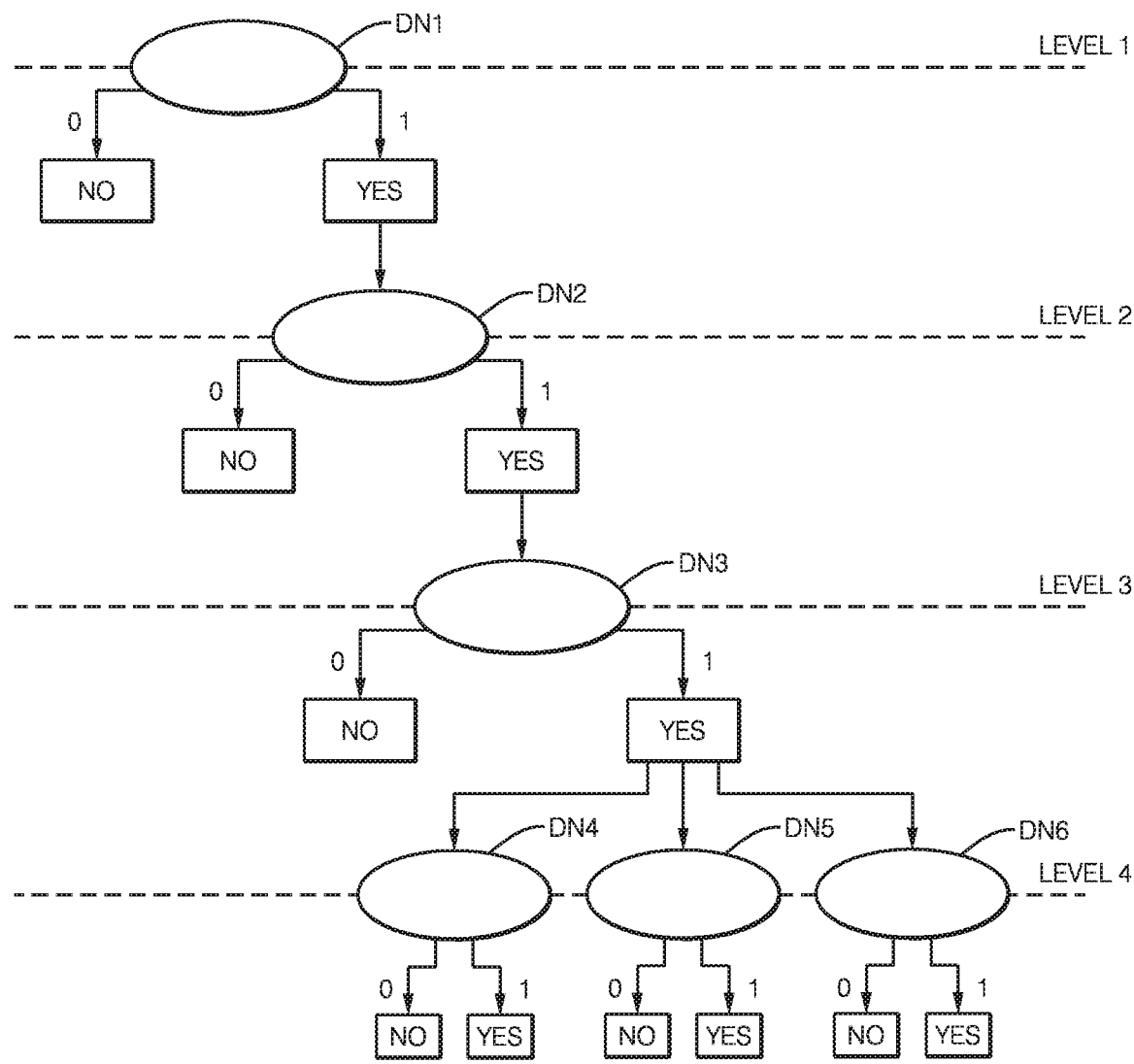
FIG. 2 is an exemplary embodiment of a hierarchical tree structure.

The states are arranged in a hierarchical structure. An example of such a hierarchical structure including a plurality of hierarchical levels is illustrated in FIG. 2. The hierarchical structure of FIG. 2 exemplarily includes four hierarchical levels, wherein the highest hierarchical level is denoted as 'level 1', the second highest hierarchical level is denoted as 'level 2', the third highest hierarchical level is denoted as 'level 3' and the fourth highest hierarchical level is denoted as 'level 4'.

In each hierarchical level one or more decision nodes are arranged. The decision nodes have oval shapes in FIG. 2 and are denoted with DN1 to DN6. Each decision node describes a respective predefined state which could be present in the interior of the vehicle. Each decision node is followed by exactly two result nodes having rectangular shapes in FIG. 2. Since exactly two result nodes are assigned to each decision node, the decision nodes can be answered with a binary answer, such as a Boolean value, or true or false, or yes or no. The result nodes indicate whether the respective state is present in the interior of the vehicle or not. In the example of FIG. 2, each result node represents either 'yes' or 'no'. The answers to the questions in the decision nodes thus describe the given scene in the interior of the vehicle to be analyzed. Each result node is a concrete answer to the parent decision node problem. The answer to a respective parent decision node problem creates a tag that can be assigned to the decision node.

For example, if one of the decision nodes represents the state 'the driver seat is occupied', this state can be either present in the given scene shown in the captured images 14, i.e., the answer is 'yes', or this state is not present in the given scene, i.e., the answer is 'no'. If the answer is 'yes' for the given scene, one could assign the tag 'the driver seat is occupied' to the decision node. In the other case, if the answer is 'no', one could assign the tag 'the driver seat is empty' to the decision node.

A result node can have a decision node as a child node in the next lower hierarchical level. In the example given above, the result node 'yes' assigned to the decision node representing the state 'the driver seat is occupied' can, for example, have the decision node 'a person occupies the driver seat' as a child node. Due to the children nodes the structure of the decision and result nodes is a tree structure.

The tree structure is not necessarily a binary tree structure, i.e., a result node can again have multiple decision nodes as children. A result node can also be a leaf in the tree, i.e., the result node has no further children.

The convolutional neural network 13 generates a respective likelihood value for each of the states described by the decision nodes. Thus, the output layer of the convolutional neural network 13 is a 1-dimensional vector where each element of the vector represents one decision node, i.e., one of the states.

In one embodiment, the output values of the convolutional neural network 13 can be mapped to a range from 0 to 1, where 0 corresponds to the left result node ('no') and 1 to the right result node ('yes'). The convolutional neural network 13 outputs scalar values between 0 and 1 that can be interpreted as the likelihood for a given decision node, i.e., the likelihood that the state described by the decision node is present in the scene captured by the imaging unit 11. Each output value of the convolutional neural network 13 corresponds directly to the likelihood for the right result node, i.e., 1 means the highest likelihood that the answer to the problem in the given decision node is in the right node, while 0 means it is highly unlikely that the answer is in the right result node. Analog the likelihood for the left result node can be computed as one minus the likelihood for the right result node. It can be interpreted as 'not' the right side.

Other output ranges, e.g., from −1 to 1, can be chosen alternatively, the mapping to likelihood values has to be adjusted accordingly.

The mapping function for mapping the output values of the convolutional neural network 13 to the likelihood values can be a linear or a non-linear function, for example, a sigmoid function.

The processing unit 12 generates a confidence value 15 for at least one of the states described by the decision nodes. For generating the confidence value 15 of a given decision node, the likelihood value of this decision node is multiplied by the likelihood values of its parents. For example, the confidence value 15 of the decision node DN3 is calculated by multiplying the likelihood values of the decision nodes DN1, DN2 and DN3. The confidence value 15 of the decision node DN4 is calculated by multiplying the likelihood values of the decision nodes DN1, DN2, DN3 and DN4. The confidence value 15 of the decision node DN5 is calculated by multiplying the likelihood values of the decision nodes DN1, DN2, DN3 and DN5. The confidence value 15 of the decision node DN6 is calculated by multiplying the likelihood values of the decision nodes DN1, DN2, DN3 and DN6.

Thus, for each state represented by one of the decision nodes the respective confidence value is generated by multiplying the likelihood value for this state with the likelihood values for a predetermined number of states arranged in hierarchically higher levels, wherein the predetermined number of states is given by the tree structure shown in FIG. 2. Further, for a given state arranged in a particular hierarchical level the product of likelihood values includes exactly one likelihood value from each hierarchical level arranged higher than the particular hierarchical level.

Compared to standard convolutional neural networks a single element in the output vector, i.e., a single output neuron, does not fully reflect the answer to a given problem. For all decision nodes which are not the root node, the resulting likelihood has to be combined with the likelihoods of all other decision nodes on the path from the given decision node through all its parent nodes.

The resulting combined likelihoods are proportional to the confidence in the given result. The larger the likelihood the higher the confidence.

If the confidence for a given result node exceeds a configurable threshold, a corresponding scene tag is assigned.

Figure 3:
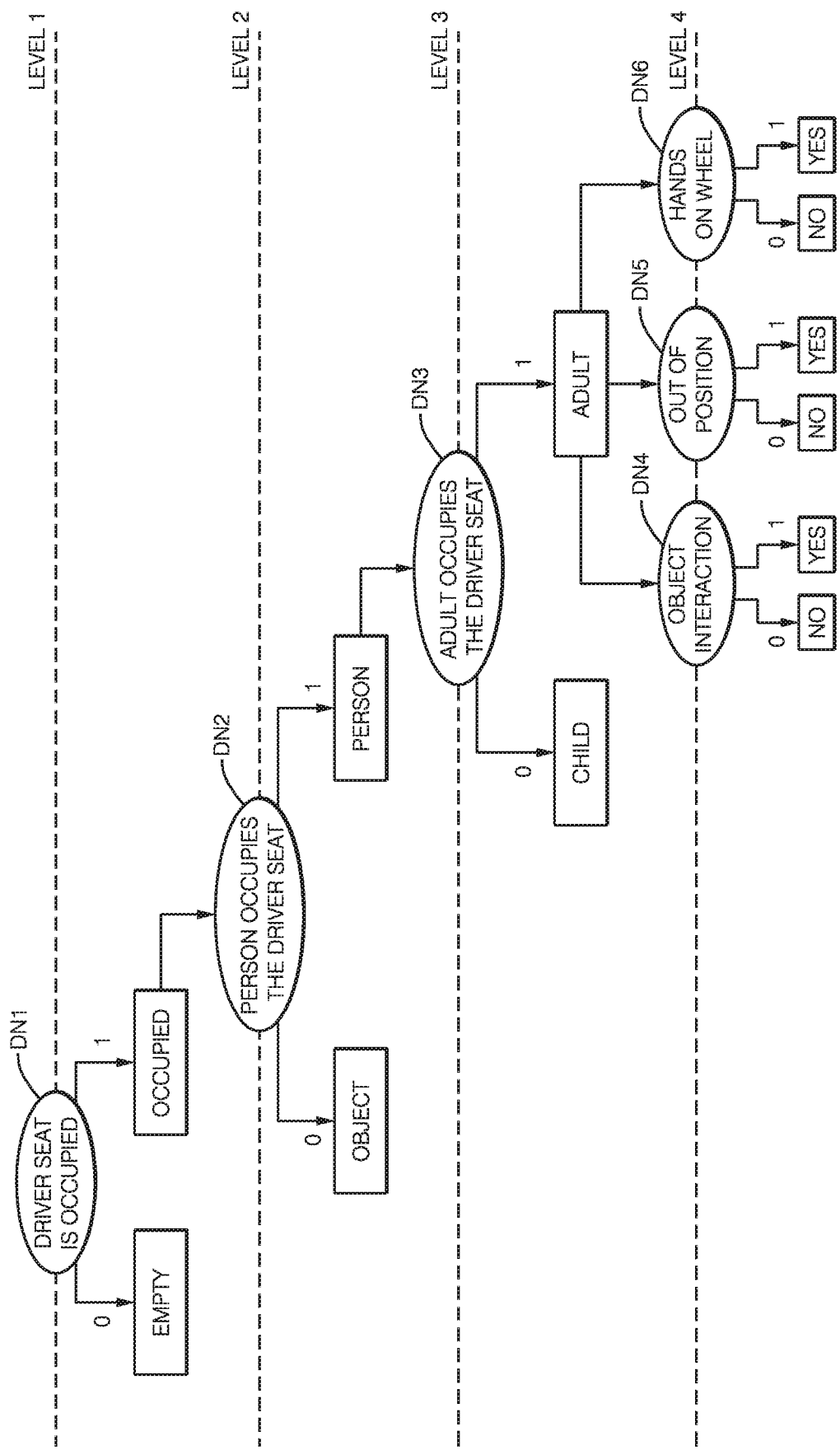
FIG. 3 is an exemplary embodiment of a hierarchical tree structure including predetermined states in the interior of a vehicle.

FIG. 3 shows the tree structure of FIG. 2 with predefined states assigned to the decision nodes DN1 to DN6. Due to the hierarchical structure the states can be organized in a hierarchical way. The decision note DN1 is assigned to the high level state 'the driver seat is occupied'. This state can be present in the interior of the vehicle, i.e., the driver seat is actually occupied, otherwise the driver seat is empty.

Starting from the high level state assigned to the decision node DN1, the level of information can be increased by the decision node DN2 following the result node 'the driver seat is occupied' in the next lower hierarchical level. In the present example, the state 'a person occupies the driver seat' is assigned to decision node DN2. This state can be true if a person sitting on the driver seat is detected in the scene or false if an object occupies the driver seat.

The result node 'a person occupies the driver seat' is further refined in the next lower hierarchical level by the state 'an adult occupies the driver seat' assigned to the decision node DN3, which can be true, i.e., an adult occupies the driver seat, or false, i.e., a child occupies the driver seat.

The result node 'an adult occupies the driver seat' is followed by the states 'the driver interacts with an object' of decision node DN4, 'the driver is out-of-position' of decision node DN5 and the state 'the driver has his hands on the steering wheel' of decision node DN6. Each of the states assigned to the decision nodes DN4 to DN6 can be either present ('yes') or not present ('no') in the interior of the vehicle.

The states DN4 to DN6 of the hierarchical level 4 shown in FIG. 3 are not mutually exclusive. For example, if the driver interacts with an object and is not in the driving position states, both states assigned to the decision nodes DN4 and DN5 are present at the same time. Further, if the driver has its hands on the steering wheel, but is not in the driving position as, for example, he looks through a side window, both states assigned to the decision nodes DN5 and DN6 are present at the same time. In other words, there may be two or more paths through the hierarchical tree structure that can be true at the same time. For example, the path including the decision nodes DN1, DN2, DN3 and D4 as well as the path including the decision nodes DN1, DN2, DN3 and DN5 may be true at the same time. In general, the hierarchical tree structure described in this application may contain a plurality of decision nodes in at least one hierarchical level that follow the same result node in the next higher hierarchical level. Every result node can have no or exactly one or more than one decision nodes as children, wherein each child creates a new path through the hierarchical tree structure. Every decision node is independent from its siblings and the paths created by the siblings are independent from each other.

Figure 4:
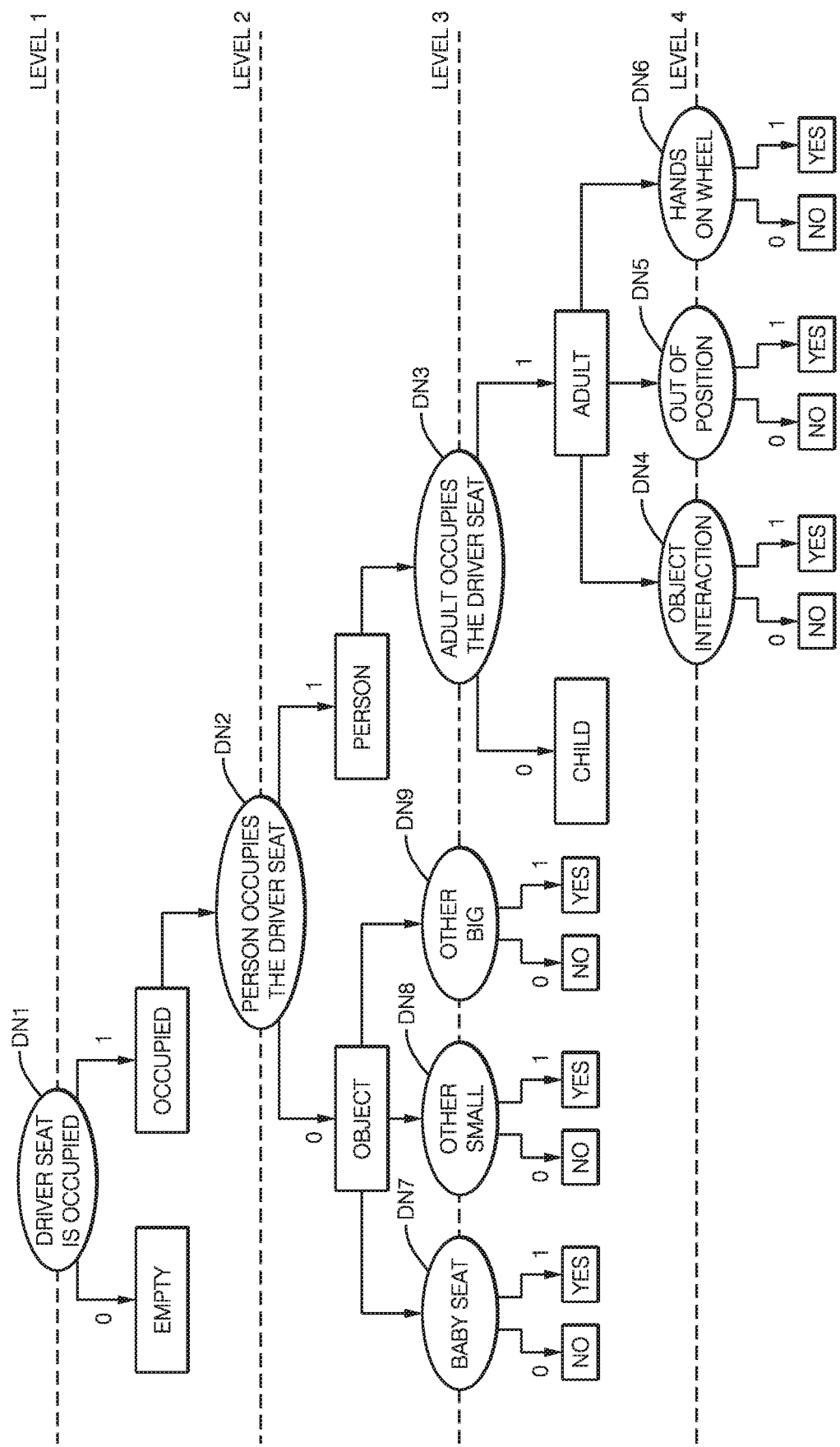
FIG. 4 is a further exemplary embodiment of a hierarchical tree structure including predetermined states in the interior of a vehicle.
Figure 5:
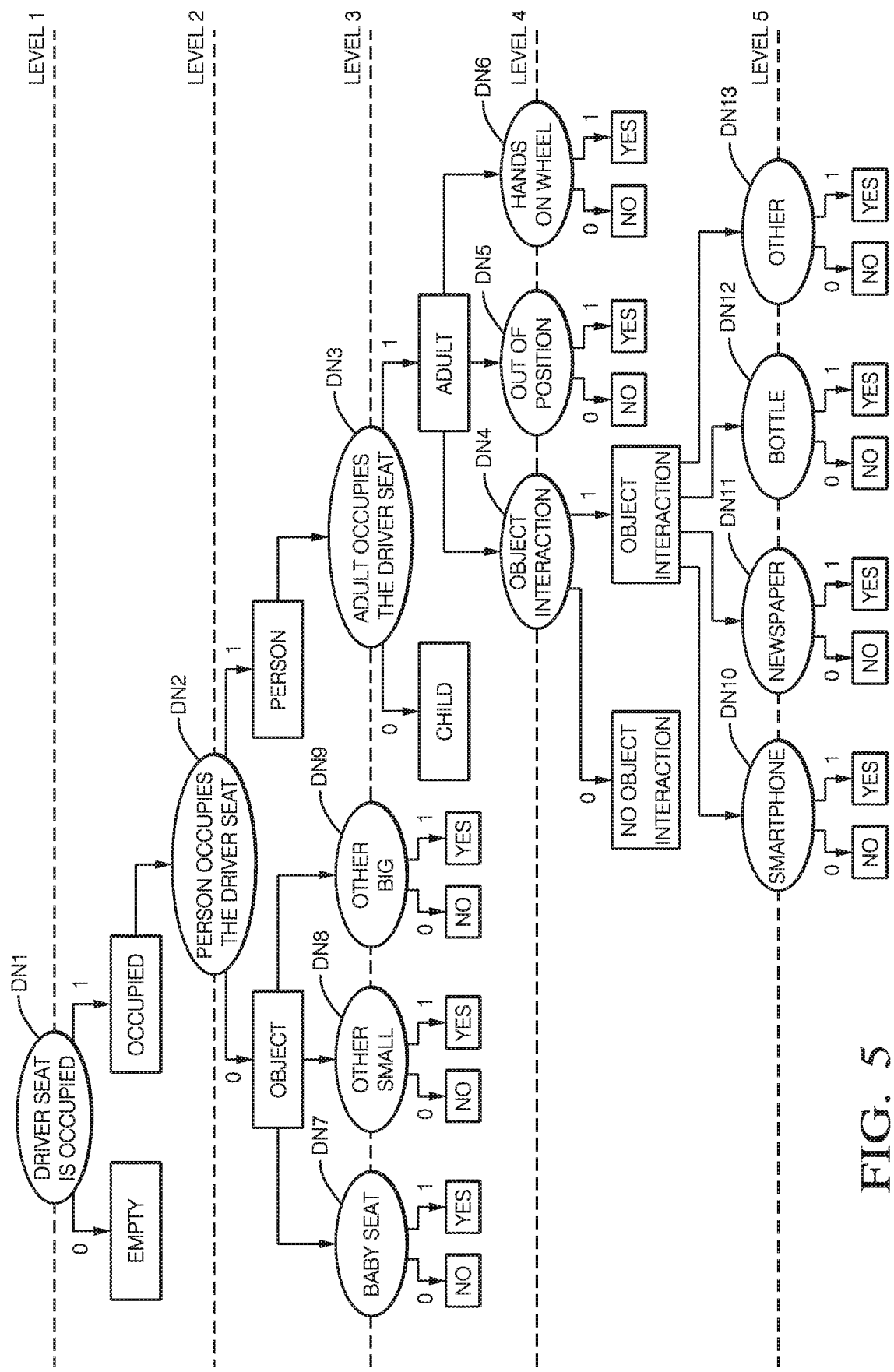
FIG. 5 is a further exemplary embodiment of a hierarchical tree structure including predetermined states in the interior of a vehicle.

The tree structure of FIG. 3 can be further refined as shown in FIGS. 4 and 5.

In FIG. 4 the result node 'an object occupies the driver seat' is linked to the sub-states 'a baby seat occupies the driver seat' of decision node DN7, 'another small object occupies the driver seat' of decision node DN8 and 'another big object occupies the driver seat' of decision node DN9. Each of the decision nodes DN7 to DN9 can be answered by either yes or no.

The tree structure shown in FIG. 5 is based on the tree structure of FIG. 4. In the tree structure of FIG. 5 the result node 'the driver interacts with an object' is linked to the sub-states 'the driver interacts with a smart phone' of decision node DN10, 'the driver interacts with a newspaper' of decision node DN11, 'the driver interacts with a bottle' of decision node DN12 and 'the driver interacts with another object' of decision node DN13. Each of the decision nodes DN10 to DN13 can be answered by either yes or no.

In an alternative tree structure one could connect the decision nodes 'the driver interacts with an object', 'the driver is out-of-position' and 'the driver has his hands on the steering wheel' to the result node 'a person occupies the driver seat'. In this case the decision would not depend on the age of the person, i.e., whether the person occupying the driver seat is an adult or a child. It mainly depends on the later use cases and combinations that would be interesting for a certain problem statement.

This concept can be further extended based on the proposed concepts. A separate tree could be allocated for one or several passenger seats. The structure of such a tree could be different from the tree structures shown in FIGS. 3 to 5 since not all of the nodes might apply to a passenger seat.

Figure 6:
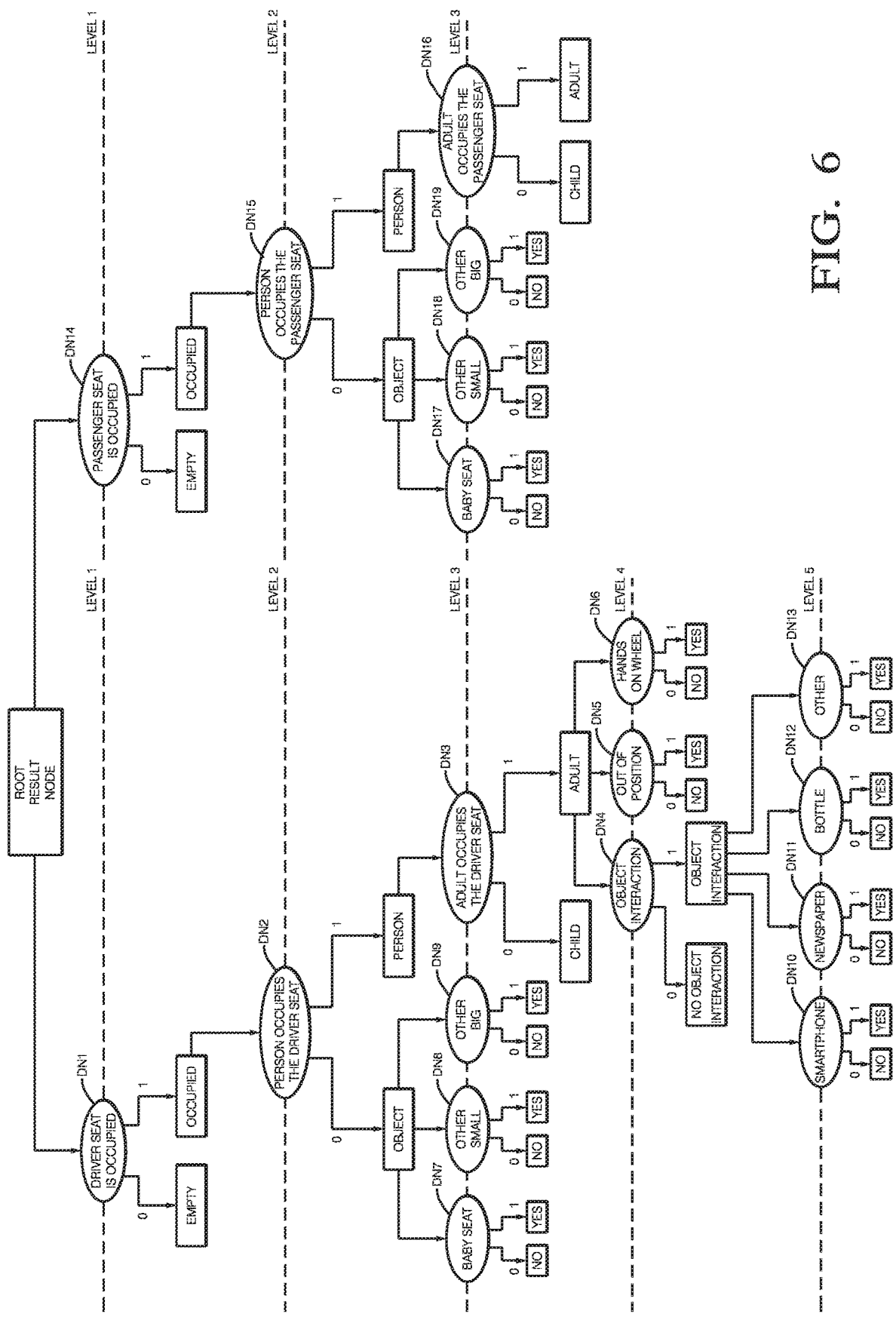
FIG. 6 is an exemplary embodiment of a hierarchical tree structure including predetermined states for the driver seat and a passenger seat in the interior of a vehicle.

It is possible to combine both the tree for the driver and the tree for the passenger into one common tree by introducing a common root result node. If there are no dependencies between the individual decision nodes all decision nodes could be children of the root result node. An example of such a hierarchical tree structure including predetermined states for the driver seat and a passenger seat is illustrated in FIG. 6. The hierarchical tree structure of FIG. 6 combines a tree for the driver seat shown on the left side of FIG. 6 and a tree for the passenger seat shown on the right side of FIG. 6. The tree for the driver seat is identical to the tree of FIG. 5. The tree for the passenger seat includes decision nodes DN14 to DN19, which are assigned to states analogue to the states of the decision nodes DN1 to DN3 and DN7 to DN9 for the driver seat and are adapted to the passenger seat. The hierarchical tree structure of FIG. 6 could be further extended by adding a tree structure for one or more back seats.

In one exemplary embodiment, the imaging unit 11 includes a 3D imaging sensor, e.g., a time of flight camera, a stereo vision camera, a structured light 3D camera or a similar 3D camera. The 3D imaging sensor outputs a 2D intensity image of the captured scene (grayscale or color) and a corresponding 2D depth map of the scene. The 2D intensity image is a 2D grid of pixels and each pixel has a value that indicates the intensity (or signal strength or amplitude) of the light signal received by the respective pixel. The 2D depth map is an image of the same size as the 2D intensity image, where each pixel in the 2D depth map reflects a distance to an object in the scene seen from a ray through the given pixel. The 2D depth map might contain the Cartesian distance, i.e., the distance between object and camera origin parallel to the image plane; or radial distances, i.e., the Euclidean distance between object and camera origin.

The camera can be positioned, for example, in the roof of the vehicle enabling a top down view or at the rear view mirror. Other possible locations include, for example, the A pillar of the vehicle, the center stack, or any other position providing a view on the vehicle seats and persons in the seats, in particular the driver seat.

The optical system of the imaging unit 11, including for example lens and active illumination, has to capture and illuminate the seat region properly. If ambient light can be used, the active illumination might be skipped.

In the system 10 a deep neural network topology is used to evaluation the states assigned to the decision nodes in the hierarchical tree structures.

The input data is the data from the imaging unit 11, e.g., a time of flight camera, in particular a 2D intensity image of the scene and a 2D depth map.

The input data is fed into the convolutional neural network 13 which can consist, for example, of several convolutional layers, pooling layers, non-linearity layers, or fully-connected layers.

The convolutional neural network 13 is trained based on pairs of input images and annotation vectors.

The annotation vector represents the ideal target function. Not all nodes in the output tree might apply for a given scene. In one embodiment the annotation is done in a binary fashion. Starting at the root of the tree for each decision node there is a binary answer to the problem, i.e., whether the state is present in the given scene or not. This decision determines the path along the tree, i.e., only the valid result node gets activated. To activate the right child result node of the decision node the entry for this node in the annotation vector set to 1 and to activate the left child result node in the tree it is set to 0.

Children of result nodes that are not activated are to be ignored in the following. All decision nodes that are children of a non-active decision node are marked by setting the corresponding entry in the annotation vector to some defined value larger than 1 or infinity.

Figure 7:
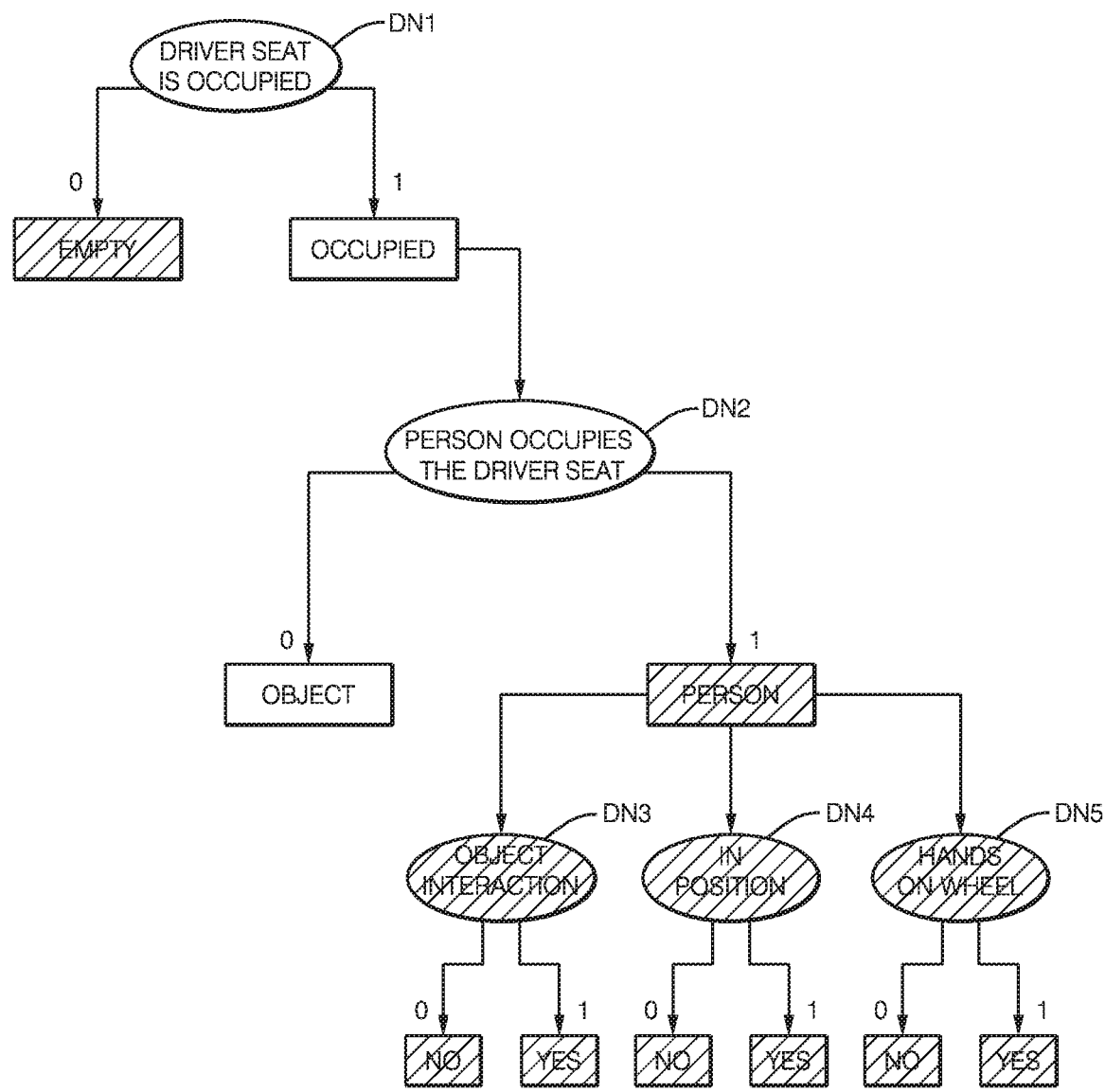
FIG. 7 is an exemplary embodiment of a hierarchical tree structure used for the training of the convolutional neural network.

The convolutional neural network 13 can be trained by inputting images showing predefined scenes of the interior of the vehicle and corresponding annotation vectors into the convolutional neural network 13. For example, an image shows a scene where the driver seat is occupied by an object. A corresponding hierarchical tree structure is illustrated in FIG. 7 where the corresponding annotation vector assigns a label to each of the decision nodes DN1 to DN5. In the current example, the label of the decision node DN1 is 1 as the driver seat is occupied and the label of the decision node DN2 is 0 as an object occupies the driver seat. Thus, the decision nodes DN1 and DN2 described states that are relevant for the image, i.e., one of the result nodes of each of the decision nodes DN1 and DN2 is activated. Further, all decision nodes of the braches of the hierarchical tree structure that do not belong to the current branch including the decision nodes DN1 and DN2 are set to the value "inf" by the annotation vector, i.e., the decision nodes DN3 to DN5. The decision nodes DN3 to DN5 describe states that are not relevant for the given image and thus none of the result nodes of the decision nodes DN3 to DN5 is activated. Instead of "inf" any other value smaller than 0 or greater than 1 can be used. The branches of the hierarchical tree structure that do not belong to the current branch are shaded in FIG. 7. Further, the convolutional neural network 13 outputs predictions for the likelihood values for each of the decision nodes as exemplarily shown in the following table 1.

TABLE 1

|  | DN1 | DN2 | DN3 | DN4 | DN5 |
|---|---|---|---|---|---|
| Prediction | 0.9 | 0.81 | 0.5 | 0.42 | 0.21 |
| Label | 1 | 0 | inf | inf | inf |
| $f_{MSE}(pred_i, lab_i)$ | −0.1 | 0.81 | 0 | 0 | 0 |

The function $f_{MSE}(pred_i, lab_i)$ is explained further below in connection with equations (4) and (5).

For the training of the convolutional neural network 13, a loss function (or cost function) is calculated using the entries of table 1. The target of the training of the convolutional neural network 13 is to minimize the result of the loss function. The training of the convolutional neural network 13 could be terminated if the result of the loss function is close to 0 or falls below a predetermined value.

The loss function may be calculated as the mean squared error $E_{MSE}$ by equation (1):

$$E_{MSE} = \frac{1}{n}\sum_{i=1}^{n}(pred_i - lab_i)^2, \quad (1)$$

where n is the total number of the decision nodes in the hierarchical tree structure, with n=5 in the current example, and $pred_i$ and $lab_i$ are the values for the prediction generated by the convolutional neural network and the label given by the annotation vector of the decision node i, respectively.

Alternatively, the cross entropy $E_{CE}$ could be used for the loss function as given by equation (2):

$$E_{CE} = -\Sigma_{i=1}^{n} lab_i \cdot \log(pred_i). \quad (2)$$

In practice, equation (2) can be extended to measure the similarity between lab and pred in a way that labels of 0 do not contribute as zero in the sum:

$$E_{CE2} = -\Sigma_{i=1}^{n} lab_i \cdot \log(pred_i) + (1-lab_i)\log(1-pred_i). \quad (3)$$

In one embodiment, non-active decision nodes will be ignored by using a special loss function that ignores these nodes, i.e., the convolutional neural network 13 can output anything at the given output neurons, but the result will not contribute to the loss which steers the adaptation of the network weights during the back-propagation step. In this embodiment the loss function $E_{MSE}$ of equation (1) is varied to ignore the non-active decision nodes. The varied loss function $E'_{MSE}$ is given by equations (4) and (5):

$$E'_{MSE} = \frac{1}{m}\sum_{i=1}^{n} f_{MSE}(pred_i, lab_i)^2 \quad (4)$$

and $$f_{MSE}(pred_i, lab_i) = \begin{cases} pred_i - lab_i, & lab_i \neq inf \\ 0, & else \end{cases}, \quad (5)$$

where m is the number of the active decision nodes that have a label other than "inf". The result of the function $f_{MSE}(pred_i, lab_i)$ is 0 for all non-active decision nodes that are labelled with the value "inf" meaning that the decision nodes with "inf" values as a label do not contribute to the loss function.

In the example given in table 1, the loss function of equation (4) is calculated as follows:

$$E'_{MSE} = \frac{1}{2}((-0.1)^2 + (0.81)^2 + 0 + 0 + 0) = 0.333 \quad (6)$$

In the present embodiment where non-active decision nodes are ignored the loss function $E_{CE}$ of equation (2) can be varied in the same fashion as the loss function $E_{MSE}$ of equation (1) which results in a varied loss function $E'_{CE}$ given by equations (7) and (8):

$$E'_{CE} = -\sum_{i=1}^{n} f_{CE}(pred_i, lab_i) \quad (7)$$

$$f_{CE}(pred_i, lab_i) = \begin{cases} lab_i \cdot \log(pred_i), & lab_i \neq inf \\ 0, & else \end{cases}, \quad (8)$$

where m is the number of the active decision nodes that have a label other than "inf". The result of the function $f_{CE}(pred_i, lab_i)$ is 0 for all non-active decision nodes that are labelled with the value "inf".

Equations (7) and (8) can be modified such that values of 0 for the labels $lab_i$ do not contribute as zero in the sum:

$$E'_{CE2} = -\sum_{i=1}^{n} f_{CE2}(pred_i, lab_i) \quad (9)$$

$$f_{CE2}(pred_i, lab_i) = \begin{cases} lab_i \cdot \log(pred_i) + & lab_i \neq inf \\ (1-lab_i)\log(1-pred_i), & \\ 0, & else \end{cases}. \quad (10)$$

The annotation could be extended to a non-binary version. In this case the left and right result node could be assigned to a value between 0 and 1, where the sum of both nodes should always be 1. A result node is considered activated if its value is above a configurable threshold.

If the tree structure only contains one level of decision nodes and all these nodes are attached to the root result node, the resulting annotation vector corresponds to an widely used 'one-hot' representation, i.e., one output neuron per decision which does not depend on any other neuron.

The difference to the hierarchical approach with more than one level of decision nodes is that one has to 'decide' for all possible decision nodes whether it is true or false. With the hierarchical approach it is possible to ignore some nodes, which can be beneficial for some use cases.

The hierarchical structure of the tree further adds some redundancy and connects states that belong together, while states that are not depending on each other are separated.

While this invention has been described in terms of the preferred embodiments thereof, it is not intended to be so limited, but rather only to the extent set forth in the claims that follow.

We claim:

1. A system for generating a confidence value for at least one state in an interior of a vehicle, said system comprising:
   an imaging unit configured to capture at least one image of the interior of the vehicle; and
   a processing unit configured to execute a convolutional neural network, the processing unit being further configured to:
   receive the at least one image from the imaging unit;
   input the at least one image into the convolutional neural network;
   generate a respective likelihood value for each of a plurality of states in the interior of the vehicle with the likelihood value for a respective state indicating the likelihood that the respective state is present in the interior of the vehicle;
   generate a confidence value for at least one of the plurality of states in the interior of the vehicle from the likelihood values generated by the convolutional neural network, the states being arranged in a hierarchical structure including a plurality of hierarchical levels;
   generate the confidence value for a respective one of the plurality of states in the interior of the vehicle by multiplying the likelihood value for the respective state and the likelihood values for exactly one state in each hierarchical level that is arranged higher than the hierarchical level of the respective state;
   train the convolutional neural network by inputting predetermined images of the interior of the vehicle into the convolutional neural network, an annotation vector being provided for each of the predetermined images and the annotation vector for a respective predetermined image indicating the states of the plurality of states that are relevant for the respective predetermined image;
   generate likelihood values for the plurality of states for each of the predetermined images; and
   calculate a loss function for each of the predetermined images with the likelihood values of the states that are relevant for the corresponding predetermined image contributing to the loss function.

2. The system as claimed in claim 1, wherein the imaging unit is a 3D imaging unit.

3. The system as claimed in claim 1,
   wherein for each of the plurality of states in the interior of the vehicle the states in the hierarchically higher levels that are used for calculating the product of likelihood values are predetermined.

4. The system as claimed in claim 1,
   wherein in at least one of the hierarchical levels there are at least two states that are not mutually exclusive.

5. The system as claimed in claim 1, further comprising a vehicle comprising the imaging unit and the processing unit.

6. The system as claimed in claim 1, wherein the states are selected from the following group of states: the driver seat is occupied, a person occupies the driver seat, an adult occupies the driver seat, the driver has his hands on the steering wheel, the driver is in a driving position, the driver interacts with an object, a predetermined seat other than the driver seat is occupied, a person interacts with a predetermined object and the driver seat is occupied by a predetermined object.

7. The system as claimed in claim 6,
   wherein the highest hierarchical level is indicative of the driver seat being occupied,
   wherein the second highest hierarchical level is indicative of a person occupying the driver seat, and
   wherein the third highest hierarchical level is indicative of an adult occupying the driver seat.

8. A method for generating a confidence value for at least one state in an interior of a vehicle, said method comprising:
   capturing at least one image of the interior of the vehicle;
   inputting the at least one image into a convolutional neural network;
   generating with the convolutional neural network a respective likelihood value for each of a plurality of states in the interior of the vehicle with the likelihood value for a respective state indicating the likelihood that the respective state is present in the interior of the vehicle;
   generating a confidence value for at least one of the plurality of states in the interior of the vehicle from the likelihood values generated by the convolutional neural network, the states being arranged in a hierarchical structure including a plurality of hierarchical levels, and the confidence value for a respective one of the plurality of states in the interior of the vehicle having been generated by multiplying the likelihood value for the respective state and the likelihood values for exactly one state in each hierarchical level that is arranged higher than the hierarchical level of the respective state;
   training the convolutional neural network by inputting predetermined images of the interior of the vehicle into the convolutional neural network, an annotation vector being provided for each of the predetermined images and the annotation vector for a respective predetermined image indicating the states of the plurality of states that are relevant for the respective predetermined image;
   generating likelihood values for the plurality of states for each of the predetermined images; and
   calculating a loss function for each of the predetermined images with the likelihood values of the states that are relevant for the corresponding predetermined image contributing to the loss function.

9. The method as claimed in claim 8, wherein the at least one image is captured by a 3D imaging unit.

10. The method as claimed in one of claim 8,
    wherein for each of the plurality of states in the interior of the vehicle the states in the hierarchically higher levels that are used for calculating the product of likelihood values are predetermined.

11. The method as claimed in claim 10,
    wherein the highest hierarchical level is indicative of the driver seat being occupied,
    wherein the second highest hierarchical level is indicative of a person occupying the driver seat, and
    wherein the third highest hierarchical level is indicative of an adult occupying the driver seat.

12. The method as claimed in claim 8, wherein the states are selected from the following group of states: the driver seat is occupied, a person occupies the driver seat, an adult occupies the driver seat, the driver has his hands on the steering wheel, the driver is in a driving position, the driver interacts with an object, a predetermined seat other than the driver seat is occupied, a person interacts with a predetermined object and the driver seat is occupied by a predetermined object.

13. The method as claimed in claim 12, wherein at least one of the hierarchical levels comprises at least two states that are not mutually exclusive.

14. A method comprising:
   training a convolutional neural network by inputting predetermined images of an interior of a vehicle into the convolutional neural network, an annotation vector being provided for each of the predetermined images and the annotation vector for a respective predetermined image indicating one or more states of a plurality of states in the interior of the vehicle that are relevant for the respective predetermined image;
   generating likelihood values for the plurality of states for each of the predetermined images; and
   calculating a loss function for each of the predetermined images with the likelihood values of the states that are relevant for the corresponding predetermined image contributing to the loss function; and
   executing the convolutional neural network to process at least one image captured of an interior of a vehicle and generating a confidence value for at least one of the plurality of states in the interior of the vehicle.

15. The method of claim 4, further comprising:
   inputting the at least one image into the convolutional neural network;
   generating a respective likelihood value for each of a plurality of states in the interior of the vehicle with the likelihood value for a respective state indicating the likelihood that the respective state is present in the interior of the vehicle;
   generating the confidence value for the at least one of the plurality of states in the interior of the vehicle from the likelihood values generated by the convolutional neural network;
   arranging the states in a hierarchical structure including a plurality of hierarchical levels; and
   generating the confidence value for a respective one of the plurality of states in the interior of the vehicle by multiplying the likelihood value for the respective state and the likelihood values for exactly one state in each hierarchical level that is arranged higher than the hierarchical level of the respective state.

16. The method of claim 14, wherein the states are selected from the following group of states: the driver seat is occupied, a person occupies the driver seat, an adult occupies the driver seat, the driver has his hands on the steering wheel, the driver is in a driving position, the driver interacts with an object, a predetermined seat other than the driver seat is occupied, a person interacts with a predetermined object and the driver seat is occupied by a predetermined object.

17. The method of claim 14, wherein the at least one image comprises a 3D image of the interior of the vehicle.

18. The method of claim 14, wherein for each of the plurality of states in the interior of the vehicle the states in the hierarchically higher levels that are used for calculating the product of likelihood values are predetermined.

19. The method of claim 14, wherein at least one of the hierarchical levels comprises at least two states that are not mutually exclusive.

20. The method of claim 14, wherein executing the convolutional neural network comprises executing the convolutional neural network using a processor of the vehicle.

* * * * *